United States Patent [19]

Alexander et al.

[11] Patent Number: 4,990,028

[45] Date of Patent: Feb. 5, 1991

[54] ANTI-FRICTION COMPOSITION CONTAINING MGO AND METHOD

[75] Inventors: William Alexander, Naperville; Mark Bertane, Elgin, both of Ill.

[73] Assignee: American Colloid Company, Arlington Heights, Ill.

[21] Appl. No.: 190,368

[22] Filed: May 5, 1988

Related U.S. Application Data

[63] Continuation-in-part of Ser. No. 784,604, Oct. 4, 1985, Pat. No. 4,944,634.

[51] Int. Cl.$^5$ ............................................. E03F 3/06
[52] U.S. Cl. ........................... 405/184; 106/197.2; 106/287.1; 252/8.51; 252/8.551
[58] Field of Search ............... 405/154, 184; 252/8.551, 8.51, 8.552, 8.512; 106/197.2, 287.1, 900

[56] References Cited

U.S. PATENT DOCUMENTS

| | | |
|---|---|---|
| 3,115,416 | 12/1963 | Chavrier ............................. 501/147 |
| 3,309,313 | 3/1967 | Callahan, Jr. ................... 252/378 R |
| 3,589,135 | 6/1971 | Ede ..................................... 405/184 |
| 3,772,893 | 11/1973 | Eilers ................................. 405/264 |
| 3,894,402 | 7/1975 | Cherrington ....................... 405/184 |
| 3,947,286 | 3/1976 | Myers et al. ....................... 524/445 |
| 3,989,632 | 11/1976 | Fischer et al. .................... 252/8.551 |
| 4,014,394 | 3/1977 | Bailey ................................ 252/8.512 |
| 4,209,409 | 6/1980 | Forster et al. ................... 252/8.552 |
| 4,221,503 | 9/1980 | Cherrington ....................... 405/184 |
| 4,319,648 | 3/1982 | Cherrington ....................... 405/184 |
| 4,439,328 | 3/1984 | Moity ................................. 252/8.51 |
| 4,618,433 | 10/1986 | Allison, III ....................... 252/8.51 |
| 4,704,214 | 11/1987 | Russell et al. .................... 252/8.51 |

*Primary Examiner*—Randolph A. Reese
*Assistant Examiner*—Arlen L. Olsen
*Attorney, Agent, or Firm*—Marshall, O'Toole, Gerstein, Murray & Bicknell

[57] ABSTRACT

Magnesium oxide is included in a bentonite clay anti-friction composition in an amount of 0.025–0.25% based on the dry weight of the clay to substantially improve the efficiency of underground cable or pipe installation. The anti-friction composition is applied between an outer surface of the cable or pipe and tunnel walls to substantially and unexpectedly reduce the amount of force, e.g., hydraulic pressure, necessary to push or pull the cable or pipe into its intended location within the tunnel. The composition includes a water-swellable colloidal smectite clay, such as bentonite, and magnesium oxide in an amount of 0.025–0.25% based on the dry weight of the clay. In another embodiment, the composition also includes a polymeric fluid loss reduction agent, such as carboxymethyl cellulose to decrease the amount of the clay composition absorbed into the tunnel walls. Soil is extracted underground to form a tunnel and the cable or pipe is forced by a hydaulic jack, into the tunnel. The tunnel walls surrounding the cable or pipe are contacted with the composition comprising a water-swellable colloidal smectite clay and magnesium oxide in an amount of 0.025–0.25% based on the dry weight of the clay, while forcing the cable or pipe into the tunnel.

16 Claims, No Drawings

ANTI-FRICTION COMPOSITION CONTAINING MGO AND METHOD

CROSS REFERENCE TO RELATED APPLICATION

This is a continuation-in-part application of Ser. No. 06/784,604, now U.S. Pat. No. 4,944,634 filed Oct. 4, 1985, now U.S. Pat. No. 4,944,634 issued on July 31, 1990.

FIELD OF THE INVENTION

The present invention is directed to an anti-friction composition containing a water-swellable colloidal smectite clay and magnesium oxide and a method of installing a cable or pipe underground, generally in a horizontal disposition, by excavating a tunnel, surrounding the cable or pipe with the composition and then forcing the cable or pipe into the tunnel. The magnesium oxide in the anti-friction composition, comprising only 0.025–0.25% and particularly 0.0375 to 0.15% based on the dry weight of the clay, unexpectedly decreases the frictional resistance encountered when the cable or pipe is forced into the tunnel.

BACKGROUND OF THE INVENTION AND PRIOR ART

Prior to the early 1970's pipe line construction across bodies of water consisted of laying the pipeline under water and anchoring it to the bed or floor of the body of water. Over a period of time, the pipe would shift and rise and it would be necessary for underwater divers to reanchor the pipe. In large bodies of water, pipelines can shift up to a mile from their original position. In the early 1970's, a drilling rig was developed capable of drilling a tunnel horizontally under the body of water and a cable could be pulled through the tunnel to maintain the cable or pipe securely in position. Similarly, larger tunnels were dug, for example for sewer pipes, and the pipe hydraulically forced into the tunnel.

Generally, this procedure is called horizontal directional drilling or pipe jacking. The drilling rig directionally tunnels, generally horizontally, while conveying the extracted soil out of the tunnel being excavated. In small diameter cable or pipeline operations, a soil stabilizing composition, such as a bentonite slurry, is pumped outwardly from the face of the drill bit or from a reaming device to stablize the soil and generally fill the tunnel with the stabilizing composition. Thereafter, the small diameter cable or pipe is pulled from one end of the tunnel to the opposite end while the bentonite slurry serves as a soil stabilizing and lubricating composition to stabilize the tunnel walls and lessen the frictional forces between an outer surface of the cable or pipe and the tunnel walls.

In larger diameter pipe laying operations, such as a sewer pipe, a stabilizing and lubricating composition, such as a bentonite slurry, is pumped through an aperture in the pipe by a manually installed hose connected from the interior of the pipe to a nozzle extending outwardly from an outer surface of the pipe. The composition lubricates the outer surface of the pipe and lessens the friction between the pipe outer surface and the tunnel walls while the pipe is forced or hydraulically jacked in sections into the tunnel. The bentonite slurry, in either case, fills the space between the outer surface of the cable or pipe and the tunnel walls to stabilize the tunnel walls during the positioning of the cable or pipe within the tunnel, and, by substantial friction lessening, dramatically increases the efficiency of the installation.

Pipe jacking has become an economical and effective alternative to other traditional open-cut methods and to monolithic mining methods previously used for installation of sewer pipes. In the pipe jacking operation, the predominant concern is to minimize friction between an outer surface of the pipe and the tunnel walls. The frictional forces between the outer surface of the pipe and the tunnel determines the distance and the amount of pipe that can be pushed from a single shaft. Each time a new shaft must be dug, productivity decreases and cost increases. This and the need to drive longer lengths of pipe greater and greater distances has increased the need for consistently high performing friction reducing agents.

The friction between the tunnel and the pipe increases in accordance with the distance between the jack and the leading pipe edge and the type of soil that the pipe is being pushed into. The frictional resistance between the tunnel wall and the pipe surface is relatively small when pipe jacking through a soil having a high clay content and relatively large through soils having a high sand or shale content.

The composition of the present invention combines with the soil to form a stable surface on the tunnel walls and the remaining composition acts as a slip agent between the tough, flexible soil surface and the outside pipe surface to unexpectedly lower the amount of hydraulic pressure needed to push the pipe into the tunnel. This reduced friction enables the hydraulic jack to push more pipe a greater distance along a tunnel, thereby lowering the cost of installation and increasing the speed and accuracy of operation.

In accordance with the present invention, quite unexpectedly it has been found that by including magnesium oxide in a water swellable clay composition in an amount of only 0.025–0.25%, particularly 0.0375–0.15%, based on the dry weight of the clay, and using this composition as a lubricating composition disposed between the outer surface of the cable or pipe and the tunnel walls, the frictional forces between the cable or pipe and the tunnel walls are unexpectedly lessened to unexpectedly improve the efficiency of cable or pipe installation.

Others have included magnesium oxide in a bentonite clay composition for the purpose of increasing the viscosity of the bentonite slurry for better carrying of drill cuttings out of a drill hole and for fluid-tight sealing in agglomeration of foundry sands as disclosed in the Bailey U.S. Pat. No. 4,014,394; the Chavrier Pat. No. 3,115,416 and the Forster et al Pat. No. 4,209,409. Further, the Callahan Jr. Pat. No. 3,309,313 discloses the use of magnesium oxide for use in an oil-based lubricating composition for stainless steel or other metal alloys subjected to temperatures ranging from 500° F. to 2400° F. As disclosed in the Callahan Jr. patent, the primary purpose of the magnesium oxide is to make the metal oxides, which are usually formed on the threaded surfaces at these temperatures, easier to rupture. As disclosed in the above-cited patents, when magnesium oxide is included in a well drilling composition to increase viscosity and improve lifting of drill cuttings, the magnesium oxide is included in a minimum amount of about 0.375% based on the dry weight of the clay in the composition.

SUMMARY OF THE INVENTION

In accordance with the present invention, magnesium oxide is included in a bentonite clay anti-friction composition in an amount of at least 0.025% based on the dry weight of the clay to substantially improve the efficiency of underground cable or pipe installation and up to a maximum in amount such that when the clay is fully hydrated, the slurry is still pumpable. Generally, pumpability is no longer possible after the MgO is included in an amount of about 0.15% based on the dry weight of the clay, but it is possible to include the MgO in the composition in a maximum amount of about 0.25%, for example, by including a viscosity reducing agent into the clay slurry. The anti-friction composition is applied between an outer surface of the cable or pipe and tunnel walls to substantially and unexpectedly reduce the amount of force, e.g. hydraulic pressure, necessary to push or pull the cable or pipe into its intended location within the tunnel. The composition includes a water-swellable colloidal smectite clay, such as bentonite, and magnesium oxide in an amount of at least 0.025%, and generally in an amount of 0.025 to 0.25% based on the dry weight of the clay.

In another embodiment, the composition also includes a polymeric fluid loss reduction agent, such as carboxymethyl cellulose in an amount of 0.05 to 2% by weight of the composition to decrease the amount of the clay composition absorbed into the tunnel walls.

In accordance with the method of the present invention, soil is extracted along a predetermined path underground to form a substantially annular tunnel having tunnel walls formed from a first path end to a second path end. A cable or pipe is then disposed at the first path end and forced, such as by a hydraulic jack, along the predetermined path toward the second path end. The tunnel walls surrounding the cable or pipe are contacted surrounding the cable or pipe with the composition comprising a water-swellable colloidal smectite clay and magnesium oxide in an amount of 0.025–0.25% based on the dry weight of the clay, while forcing the cable or pipe along the predetermined path to its intended position.

Accordingly, an object of the present invention is to provide a new and improved anti-friction composition and method.

Another object of the present invention is to provide a new and improved anti-friction composition for use in forcing a cable or pipe into an underground tunnel.

Another object of the present invention is to provide a new and improved anti-friction composition and method including excavating soil to provide an underground tunnel, and forcing a cable or pipe into the tunnel while lubricating an outer surface of the cable or pipe with a water-swellable clay composition containing MgO.

The above and other objects and advantages of the present invention will become apparent from the following detailed description of the preferred embodiments.

DETAILED DESCRIPTION OF THE PREFERRED EMBODIMENTS

The anti-friction composition of the present invention includes a water-swellable colloidal clay, and magnesium oxide in an amount of 0.025–0.25% based on the dry weight of the clay. The water-swellable colloidal clay utilized in the clay composition of the present invention is any water swellable colloidal clay which will hydrate in the presence of water, i.e., will swell in the presence of water. In accordance with one important embodiment of the present invention, the colloidal clay is bentonite. A preferred bentonite is sodium bentonite which is basically a hydratable montmorillonite clay of the type generally found in the Black Hills region of South Dakota and Wyoming. This clay has sodium as a predominant exchange ion. However, the bentonite utilized in accordance with this embodiment of the present invention may also contain other cations such as magnesium and iron. There are cases wherein a montmorillonite predominant in calcium ions can be converted to a high swelling sodium variety through a well known process called "peptizing". The colloidal clay utilized in this invention may be one or more peptized bentonites. The colloidal clay may also be any member of the dioctahedral or trioctahedral smectite group or mixtures thereof. Examples are Beidellite, Nontronite, Hectorite and Saponite. The colloidal clay, e.g., bentonite, generally is finely divided as known for use in water barrier panels and the like, e.g., 150 to 350 mesh.

The magnesium oxide is generally incorporated into the composition in powdered form having a particle size of 44–74 microns, but the size of the magnesium oxide is not critical to the composition or method of the present invention.

Quite unexpectedly, the water-swellable clay composition of the present invention containing magnesium oxide in an amount of only 0.025–0.25% by dry weight of the clay, and especially in the range of 0.025–0.25% by dry weight of the clay, essentially doubles the distance that a pipe or cable can be hydraulically pushed within a tunnel thereby unexpectedly decreasing the cost of pipe or cable installation.

In accordance with another important embodiment of the present invention, the anti-friction clay composition containing 0.025–0.25% MgO based upon the dry weight of the clay also includes a fluid loss reduction agent, or thickening agent, such as the water-dispersible or water-soluble polymers disclosed in U.S. Pat. Nos. 3,772,893 and 4,439,328. For example, the polymer may comprise gum ghatti, gum arabic, gum tragacanth, locust bean gum, gum karaya, guar gum, carrageenan, algin, biopolymers, hydroxyethyl cellulose, hydroxyethyl ghatti gum, hydroxyethyl arabic gum, hydroxyethyl tragacanth gum, hydroxyethyl locust bean gum, hydroxyethyl karaya gum, hydroxyethyl guar gum, hydroxyethyl carrageenan, hydroxyethyl alginate, hydroxyethyl xanthan gum, carboxymethyl cellulose, carboxymethyl ghatti gum, carboxymethyl arabic gum, carboxymethyl tragacanth gum, carboxymethyl locust bean gum, carboxymethyl karaya gum, carboxymethyl guar gum, carboxymethyl carrageenan, carboxymethyl alginates, carboxymethyl xanthan gum, hydroxyethyl carboxymethyl cellulose, hydroxyethyl carboxymethyl ghatti gum, hydroxyethyl carboxymethyl arabic gum, hydroxyethyl carboxymethyl tragacanth gum, hydroxyethyl carboxymethyl locust bean gum, hydroxyethyl carboxyethyl karaya gum, hydroxyethyl carboxymethyl guar gum, hydroxyethyl carboxymethyl carrageenan, hydroxyethyl carboxymethyl alginates, hydroxyethyl carboxymethyl xanthan gum, hydroxypropyl cellulose, hydroxypropyl ghatti gum, hydroxypropyl arabic gum, hydroxypropyl tragacanth gum, hydroxypropyl bean gum, hydroxypropyl karaya gum, hydroxypropyl guar gum, hydroxypropyl carrageenan, hydroxypropyl alginates, hydroxypropyl xanthan gum, and mixtures thereof.

The preferred polymers for use in this invention are carboxymethyl cellulose, hydroxyethyl cellulose, carboxymethyl hydroxyethyl cellulose, and mixtures thereof. Other suitable water soluble polymers are the polymers of acrylic or methacrylic acid derivatives, for example, acrylic acid, the alkali metal and ammonium salts of acrylic acid, methacrylic acid, the alkali metal and ammonium salts of methacrylic acid, acrylamide, methacrylamide, the N-alkyl substituted amides, the N-aminoalkylamides, and the corresponding N-alkylaminoalkyl substituted amides, the aminoalkyl acrylates, the aminoalkyl methacrylamides and the N-alkyl substituted aminoalkyl esters of either acrylic or methacrylic acids. These polymeric compositions may be the homopolymers or they may be copolymers with other copolymerizing monomers such as ethylene, propylene, isobutylene, styrene, -methylstyrene, vinyl acetate, vinyl formate, alkyl ethers, acrylonitrile, methacrylonitrile, vinyl chloride, vinylidene chloride, the alkyl acrylates, the alkyl methacrylates, the alkyl maleates, and the alkyl fumarates, and other olefinic monomers copolymerizable therewith.

In order to illustrate the new and unexpected results achieved using the composition of the present invention, including the claimed percentages of MgO, as an anti-friction composition for moving one solid object with respect to another solid, frictionally engaging object, compositions were prepared (1) with bentonite clay only, (2) with bentonite clay and percentages of MgO from 0.025 to 0.25% by wt. MgO; (3) with bentonite clay, MgO, and a carboxy methylcellulose (CMC) thickening agent; and (4) with bentonite clay and CMC only. The compositions including the CMC were tested to prove that the new and unexpected anti-friction or lubricating results achieved with the compositions described herein are attributable to the water swellable clay and MgO combination and not substantially affected by the thickening agent (e.g., CMC).

The test compositions were prepared having
(1) bentonite clay alone;
(2) (a) bentonite clay and 0.1 pound MgO per ton of dry bentonite (0.005% MgO based on the dry weight of bentonite);
(b) bentonite clay and 0.25 pound MgO per ton of dry bentonite (0.0125% MgO based on the dry weight of bentonite);
(c) bentonite clay and 0.50 pounds MgO per ton of dry bentonite (0.025% MgO based on the dry weight of bentonite);
(d) bentonite clay and 0.75 pounds MgO per ton of dry bentonite (0.0375% MgO based on the dry weight of bentonite);
(e) bentonite clay and 1.0 pounds MgO per ton of dry bentonite (0.05% MgO based on the dry weight of bentonite);
(f) bentonite clay and 1.5 pounds MgO per ton of dry bentonite (0.075% MgO based on the dry weight of bentonite);
(g) bentonite clay and 2 pounds MgO per ton of dry bentonite (0.1% MgO based on the dry weight of bentonite);
(h) bentonite clay and 3.0 pounds MgO per ton of dry bentonite (0.15% MgO based on the dry weight of bentonite);
(i) bentonite clay and 4.0 pounds MgO per ton of dry bentonite (0.20% MgO based on the dry weight of bentonite); and
(j) bentonite clay and 5.0 pounds MgO per ton of dry bentonite (0.25% MgO based on the dry weight of bentonite);
(3) bentonite clay and 2 pounds MgO per ton of dry bentonite and 10 pounds CMC per ton of bentonite; and
(4) bentonite clay and 10 pounds CMC per ton of dry bentonite. All compositions were mixed with sufficient water to form a slurry having 6.25% by weight solids, and mixed sufficiently vigorously for a time sufficient (15 minutes) in a Waring blender to make sure that the bentonite is 100% hydrated.

All slurry compositions described above, were tested for coefficient of friction using a Falex No. 6 friction wear tester using ASTM test procedure D41-72. The results are set forth in TABLE I:

TABLE I

| COMPOSITION | COEFFICIENT OF FRICTION | % REDUCTION IN COEFFICIENT OF FRICTION |
|---|---|---|
| 1 | | |
| bentonite alone | 0.3918 | — |
| 2 | | |
| (a) .005% MgO | 0.3899 | 0.49 |
| (b) .0125% MgO | 0.3888 | 0.77 |
| (c) .025% MgO | 0.3800 | 3.01 |
| (d) .0375% MgO | 0.3200 | 18.33 |
| (e) .05% MgO | 0.3000 | 23.43 |
| (f) .075% MgO | 0.2498 | 36.24 |
| (g) .1% MgO | 0.2259 | 42.34 |
| (h) .15% MgO | 0.2000 | 48.95 |
| (i) .20% MgO | 0.1800 | 54.06 |
| (j) .25% MgO | 0.1500 | 61.72 |
| 3 | | |
| bentonite, .1% MgO & .5% CMC | 0.2151 | 45.1 |
| 4 | | |
| bentonite & .5% CMC | 0.3900 | .46 |

As shown in Table I, the coefficient of friction is reduced unexpectedly beginning at MgO contents of 0.025% MgO based on the dry weight of bentonite (composition 2(c)). MgO included in an amount of 0.0125% MgO reduced the coefficient of friction only 0.77%; doubling the amount of MgO to 0.025%, however, reduced the coefficient of friction almost four times the amount to 3.01%.

Above 0.025% MgO, the coefficient of friction is reduced even more unexpectedly. For example, at an MgO content of 0.0375% (composition 2(d)), the coefficient of friction is reduced 18.33%. These coefficient of friction reductions proceed unexpectedly to 61.72% at an MgO content of 0.25% MgO (only one-quarter of one percent based on the dry weight of the clay). Contents of MgO above 0.25% MgO resulted in a composition that was too viscous to pump.

The compositions of the present invention are useful for moving any solid object with respect to another solid object where the objects are in close proximity, one to another, where movement of one solid object with respect to the other solid object is substantially hindered by frictional forces exerted between adjacent, frictionally engaging surfaces of the two objects. The composition of the present invention is contacted on the adjacent surfaces, as by spraying the slurry composition onto the adjacent, contacting surfaces so that the objects are moved much more easily one with respect to the other.

What is claimed and desired to be secured by Letters Patent of the United States is:

1. A method of installing a cable or conduit underground comprising:

extracting soil along a predetermined path underground to form a substantially annular tunnel having tunnel walls formed by said soil extraction extending from a first path end to a second path end;

disposing said cable or pipe at said first path end and forcing said cable or pipe along said predetermined path toward said second path end; and contacting the tunnel walls surrounding the cable or pipe with a pumpable composition comprising a fully hydrated water-swellable smectite clay and MgO, wherein the MgO comprises at least 0.025% based on the dry weight of the clay, while forcing said cable or pipe along said predetermined path to substantially lessen the friction between an outer surface of the cable or pipe and the tunnel walls, and to stabilize the tunnel walls thereby substantially lessening the time and/or force necessary to install the cable or pipe.

2. The method of claim 1 wherein the clay composition comprises a slurry of bentonite clay and MgO in water wherein the MgO comprises 0.025–0.25% based on the dry weight of the clay.

3. The method of claim 1 wherein the clay composition comprises a slurry of bentonite clay and MgO in water wherein the MgO comprises 0.0375–0.15% based on the dry weight of the clay.

4. The method of claim 1 wherein the clay composition comprises a slurry of bentonite clay and MgO in water and wherein the bentonite clay comprises at least 2% by weight of the water slurry.

5. The method of claim 4 wherein the bentonite clay comprises 4–10% by weight of the water slurry and the MgO comprises 0.001–0.05% by weight of the water slurry.

6. The method of claim 1 wherein the clay composition includes a polymeric fluid loss reduction agent to lessen the amount of clay composition absorbed into the tunnel walls.

7. The method of claim 6 wherein the fluid loss reduction agent comprises carboxymethyl cellulose in an amount of 0.25% to 2% based on the dry weight of clay in the composition.

8. The method of claim 1 including pumping the clay composition between the outer surface of the cable or pipe and the tunnel walls while forcing the cable or pipe along said predetermined path to provide structural integrity to said space during and after completion of said installation.

9. The method of claim 1 wherein the composition is applied between the outer surface of the cable or pipe and the tunnel walls by pumping the composition through an aperture in the cable or pipe from the interior of the cable or pipe.

10. The method of claim 1 wherein the composition is contacted against the tunnel walls by spraying the composition against the tunnel walls during formation of said tunnel.

11. The method of claim 10 including substantially filling said tunnel with said composition during formation of said tunnel.

12. An anti-friction composition for reducing frictional forces between an outer surface of a cable or pipe and soil-surfaces of an underground tunnel comprising a water-swellable smectite clay and MgO in an amount of 0.0375–0.15% based on the dry weight of the clay.

13. The composition of claim 12 wherein the composition includes water and wherein the smectite clay comprises bentonite in an amount of at least 2% by weight of the composition.

14. The composition of claim 12 further including a polymeric fluid loss reduction agent.

15. The composition of claim 14 wherein the fluid loss reduction agent comprises carboxy methyl cellulose.

16. A method of moving one solid object with respect to another solid object, wherein said solid objects are in close proximity, one to another, such that movement of said one solid object with respect to the other solid object is hindered by frictional forces exerted between the solid objects on frictionally engaging adjacent surfaces, the method comprising: contacting said frictionally engaging adjacent surfaces of said objects with the pumpable composition comprising a water swellable smectite clay and MgO, wherein the MgO comprises 0.025% to 0.25% based on the dry weight of the water swellable clay, and forcing said one solid object to move with respect to the other solid object against the frictional force remaining between the two adjacent surfaces.

* * * * *